(12) United States Patent
Tolfmans (10) Patent No.: US 7,995,759 B1
(45) Date of Patent: Aug. 9, 2011

(54) SYSTEM AND METHOD FOR PARALLEL COMPRESSION OF A SINGLE DATA STREAM

(75) Inventor: Joakim Bengt Lennart Tolfmans, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 817 days.

(21) Appl. No.: 11/528,786

(22) Filed: Sep. 28, 2006

(51) Int. Cl.
*H04K 1/00* (2006.01)
(52) U.S. Cl. ........ 380/269; 380/217; 380/232; 382/232; 707/808; 707/809; 707/802; 707/803; 711/100
(58) Field of Classification Search .................. 380/269, 380/217, 232; 382/232; 707/802–803, 808–809; 711/100
See application file for complete search history.

(56) References Cited

U.S. PATENT DOCUMENTS

| | | | |
|---|---|---|---|
| 1,310,719 A | | 7/1919 | Vernam |
| 4,262,329 A | | 4/1981 | Bright et al. |
| 4,386,416 A | * | 5/1983 | Giltner et al. .................. 710/68 |
| 4,558,176 A | | 12/1985 | Arnold et al. |
| 4,588,991 A | | 5/1986 | Atalla |
| 4,757,533 A | | 7/1988 | Allen et al. |
| 5,065,429 A | | 11/1991 | Lang |
| 5,150,407 A | | 9/1992 | Chan |
| 5,161,193 A | | 11/1992 | Lampson |
| 5,175,766 A | | 12/1992 | Hamilton |
| 5,185,717 A | | 2/1993 | Mori |
| 5,235,641 A | | 8/1993 | Nozawa et al. |
| 5,235,642 A | | 8/1993 | Wobber et al. |
| 5,265,159 A | | 11/1993 | Kung |
| 5,517,614 A | * | 5/1996 | Tajima et al. ..................... 714/1 |
| 5,677,952 A | | 10/1997 | Blakley, III et al. |
| 5,687,237 A | | 11/1997 | Naclerio |
| 5,720,034 A | | 2/1998 | Case |
| 5,729,228 A | * | 3/1998 | Franaszek et al. ............ 341/106 |
| 5,754,651 A | | 5/1998 | Blatter et al. |
| 5,870,468 A | | 2/1999 | Harrison |
| 5,931,947 A | | 8/1999 | Burns |
| 5,933,498 A | | 8/1999 | Schneck et al. |
| 5,940,507 A | | 8/1999 | Cane et al. |
| 6,073,237 A | | 6/2000 | Ellison |
| 6,134,660 A | | 10/2000 | Boneh et al. |
| 6,175,925 B1 | | 1/2001 | Arnold |
| 6,185,681 B1 | | 2/2001 | Zizzi |
| 6,185,684 B1 | | 2/2001 | Pravetz et al. |
| 6,212,600 B1 | | 4/2001 | Friedman et al. |
| 6,249,866 B1 | | 6/2001 | Brundrett |

(Continued)

OTHER PUBLICATIONS

Anderson et al., "The Steganographic File System," Information Hiding, Second International Workshop, IH '98 Portland, Oregon. USA, Apr. 14-17, 1998, Proceedings, pp. 73-82, 1998.

(Continued)

*Primary Examiner* — Taghi T Arani
*Assistant Examiner* — Angela Holmes
(74) *Attorney, Agent, or Firm* — Cesari and McKenna, LLP (57) ABSTRACT

A system and method provide parallel compression of a single data stream is provided. A data stream entering a storage encryption processor is split by a splitting stage into a plurality of substantially equal segments. Each of the segments is stored in one of a first set of memories in a round robin fashion. Each memory has an associated compression core that reads the segments associated with each memory and compresses the data before storing the compressed segments in a second set of memories. A merging stage reads the compressed segments from the second set of memories and creates a single compressed data stream.

17 Claims, 5 Drawing Sheets

U.S. PATENT DOCUMENTS

| | | | |
|---|---|---|---|
| 6,345,101 | B1 | 2/2002 | Shukla |
| 6,356,941 | B1 | 3/2002 | Cohen |
| 6,405,315 | B1 | 6/2002 | Burns et al. |
| 6,414,884 | B1 | 7/2002 | DeFelice et al. |
| 6,507,911 | B1 | 1/2003 | Langford |
| 6,550,011 | B1 | 4/2003 | Sims, III |
| 6,625,734 | B1 | 9/2003 | Marvit et al. |
| 6,636,966 | B1 | 10/2003 | Lee et al. |
| 6,684,222 | B1 | 1/2004 | Cornelius et al. |
| 6,708,272 | B1 | 3/2004 | McCown et al. |
| 6,735,693 | B1 | 5/2004 | Hamlin |
| 6,754,827 | B1 | 6/2004 | Cane et al. |
| 6,792,544 | B2 | 9/2004 | Hashem |
| 6,839,437 | B1 | 1/2005 | Crane et al. |
| 6,851,056 | B2 | 2/2005 | Evans |
| 6,857,076 | B1 | 2/2005 | Klein |
| 6,915,435 | B1 | 7/2005 | Merriam |
| 6,993,661 | B1 | 1/2006 | Garfinkel |
| 7,003,674 | B1 | 2/2006 | Hamlin |
| 7,020,779 | B1 | 3/2006 | Sutherland |
| 7,093,127 | B2 | 8/2006 | McNulty et al. |
| 7,096,355 | B1 | 8/2006 | Marvit et al. |
| 7,185,192 | B1 | 2/2007 | Kahn |
| 7,215,771 | B1 | 5/2007 | Hamlin |
| 7,240,197 | B1 | 7/2007 | Yamagami et al. |
| 7,260,724 | B1 | 8/2007 | Dickinson et al. |
| 7,783,898 | B2 | 8/2010 | Detrick et al. |
| 2001/0054155 | A1 | 12/2001 | Hagan et al. |
| 2002/0073324 | A1 | 6/2002 | Hsu |
| 2002/0091935 | A1 | 7/2002 | Smith et al. |
| 2002/0114453 | A1 | 8/2002 | Bartholet et al. |
| 2003/0028765 | A1 | 2/2003 | Cromer et al. |
| 2004/0153642 | A1 | 8/2004 | Plotkin |
| 2007/0058801 | A1 | 3/2007 | Plotkin |
| 2007/0174634 | A1 | 7/2007 | Plotkin |

OTHER PUBLICATIONS

Antonelli, et al., "The Packet Vault: Secure Storage of Network Data," CITI Technical Report 98-5, pp. 1-15, Jun. 25, 1998.

Blaze, "Oblivious Key Escrow," Information Hiding, First International Workshop, Cambridge, UK, May 3D-Jun. 1, 1996, Proceedings, pp. 335-343, 1996.

Blaze, "A cryptographic File System for Unix," Proceedings of the First ACM Conference on Computer and Communciations Security, pp. 9-16 (1993).

Blaze, "Key Management in an Encrypting File System," USENIX Summer 1994 Technical Conference, pp. 27-35, (Jun. 6-10, 1994).

Boneh, et al., "A Revocable Backup System," in Proceedings 6th USENIX Security Conference, pp. 91-96, 1996.

Cattaneo, et al. "The Design and Implementation of a Transparent Cryptographic Filesystem for UNIX," Proceedings of The FREENIX Track: 2001 UNIX annual Technical Conference, pp. 199-212 (Jun. 25-30, 2001)

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology—EUROCRYPT '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing Proceedings of the Northeast ACM Symposium on Personal Computer Security, pp. 38-45 (1986).

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes, " IBM Technical Disclosure Bulletin, pp. 444-445, Feb. 1991.

"Disappearing Inc. Makes Old Email Vanish Everywhere; Reduces Corporate Liability as well as Improves corporate Productivity by Enabling Sensitive Communciations via Email-company Busines and Marketing," Edge: Work-Group Computing Report, http://findarticles.com/p/articJes/mLmOWUB/is_1999_0cU 1/aL 56260487/print (Oct. 11, 1999).

Double, "Encryption Key Security by Electric Field Destruction of Memory Cells," IBM Technical Disclosure Bulletin, pp. 8-11, Jan. 1989.

FIPS PUB 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

FIPS PUB 140-1, "Security Requirements for Cryptographic Modules," Federal Information Processing Standards Publication 140-1, National Institute of Standards and Technology, Jan. 11, 1994, 44 pages.

Flavin, et al., "Data Protection on Magnetic Media Via an Encrypting Controller," IBM Technical Disclosure Bulletin, vol. 3D. No. 23, pp. 1284-1285 (Aug. 1987).

Garfinkel, S., "PGP: Pretty Good Privacy," O'Reilly & Associates, pp. 43, 54-55, 65-67, 151-153, Jan. 1995.

Garfinkel, S., "Omniva's Self-Destructing Email," Web Security, Privacy and Commerce, Second Edition, O'Reilly & Associates, Inc., Sebastopol, CA, pp. 280-283, Jan. 2002.

Gobioff, Howard, et al., "Security for Networked Attached Storage Devices," Carnegie Mellon University Computer Science Technical Report CMU-CS-99-160, Oct. 1997, 20 pages.

Gobioff, Howard, "Security for a High Performance Commodity Storage Subsystem," Carnegie Mellon University Computer Science Technical Report CMU-CS-99-160, Jul. 1999, 222 pages.

Gobioff, Howard, et al., "Smart Cards in Hostile Environments," Proceedings of the Second USENIX Workshop on Electronic Commerce, pp. 23-28 (Nov. 18-21, 1996).

Graham, et al, "Data Protection at the Volume Level," IBM Technical Disclosure Bulletin, pp. 146-148, Oct. 1988.

Gutmann, "Secure Deletion of Data from Magnetic and Solid-State Memory," Proceedings of the Sixth Annual USENIX Security Symposium: Focusing on Applications of Cryptograpy, pp. 7-89 (Jul. 22-25, 1996).

Hwang, et al., "An Access Control Scheme Based on Chinese Remainder Theorem and Time Stamp Concept," Computers & Security, vol. 15, No. 1, pp. 73-81, 1996..

IBM Crypto Server Management General Information Manual, First Edition (May 2000), 16 pages.

IBM SecureWay Cryptographic Products IBM 4758 PCI Cryptographic Coprocessor Installation Manual, Security Solutions and Technology Department, Second Edition (Mar. 2000), 34 pages.

IBM SecureWay, UltraCypher Cryptographic Engine (Datasheet) (1998), 2 pages.

IBM 4758 PCI Cryptographic Coprocessor Custom Software Installation Manual, Second Edition, Jan. 2001, 30 pages.

Avoid Litigation: Encrypt Your Data, InfoTech Research Group, Sep. 19, 2006, 6 pages.

Johnson et al., "Self-Destructing Diskette," IBM Technical Disclosure Bulletin, vol. 33, No. 1A, pp. 218-219 (Jun. 1990).

Mallett, "Considerations for Applying Disk Encryptors 10 Environments Subject to Hostile Overrun," IEEE, pp. 218-222, 1991.

Mauriello, "TCFS: Transparent Cryptographic File system," LINUX Journal, Aug. 1,1997, 8 pages.

Menezes et al., "Handbook of Applied Cryptography," CRC Press, Section 13.7.1, 4 pages, 1997.

Moore, "Preventing Access to a Personal Computer," IBM Technical Disclosure Bulletin, pp. 98-100, Sep. 1992.

Omniva Policy Systems, www.omniva.com, (Aug. 2004), downloaded from web.archive.org on Aug. 24, 2004, 19 pages.

Provos, Niels, "Encrypting Virtual Memory," CITI Technical Report 00-3, Center for Information Technology Integration, University of Michigan, Apr. 25, 2000, 11 pages.

Scherzer. "Memory Protection in Chip Cards," IBM Technical Disclosure Bulletin, pp. 416-417, Oct. 1989.

Schneier, "Applied Cryptography Second Edition: Protocols, Algorithms, and Source Code in C," John Wiley & Sons, Inc. pp. 5, 15, 179-181, 185, 213-214, 225, 229, 563-566, and 569. 1996.

Slusarczuk et al., "Emergency Destruction of Information Storage Media," Institute for Defense Analysis, IDA Report R-321, Dec. 1987, 196 pages.

Smith, "Verifying Type and Configuration of an IBM 4758 Device: A While Paper," IBM T.J. Watson Research Center pp. 1-7.

Smith et al., "IBM Research Report: Building a High-Performance, Programmable Secure Coprocessor," IBM Research Division, Computer Science/Mathematics, RC 21102(94393) (Feb. 19, 1198), 61 pages.

Stinson, Douglas R., "Cryptography: Theory and Practice," CRC Press, Mar. 1, 1995, 228 pages.

Vernam, "Cipher Printing Telegraph Systems for Secret Wire and Radio Telegraphic Communications," Journal of the AI EE. pp. 109-115, Feb. 1926.

Weingart, "Physical Security for the uABYSS System," Proceedings 1987 IEEE Symposium on Security and Privacy, pp. 2-58 (Apr. 27-29, 1987), pp. 52-58.

Whitten et al., "Usability of Security: A Case Study," CMU Computer Science Technical Report CMU-CS-98-155. pp. 1-39, Dec. 18, 1998.

Yee et al., "Secure Coprocessors in Electronic Commerce Applications," Proceedings of the First USENIX Workshop of Electronic Commerce, pp. 155-170, Jul. 11-12, 1995.

Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).

Zadok et al., "Cryptfs: A Stackable Vnode Level Encryption File System," Computer Science Department, Columbia University, CUCS-021-98, pp. 1-14, Jun. 1998.

Plotkin et al., "Encryption Based Security System for Network Storage", U.S. Appl. No. 60/292,088, filed May 17, 2001, 28 pages.

Supplementary European Search Report, European Application No.: 02734438.1-2212/ 1388061, PCT/US0215421, Applicant: Decru, Inc., Date of Mailing: Oct. 6, 2010, pp. 1-5.

\* cited by examiner

SYSTEM AND METHOD FOR PARALLEL COMPRESSION OF A SINGLE DATA STREAM

CROSS-REFERENCE TO RELATED APPLICATION

The present invention is related to the following commonly assigned U.S. patent application Ser. No. 10/478,386 titled, Encryption Based Security System for Network Storage, filed May 14, 2003, which application is hereby incorporated by reference.

FIELD OF THE INVENTION

The present invention relates to security appliances, and more specifically, to decreasing the latency caused by compression of data within a security appliance.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored data using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients operating in a SAN environment are "initiators" that initiate commands and requests to access data. The storage system is thus a "target" configured to respond to the data access requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

A SAN arrangement or deployment allows decoupling of storage from the storage system, such as an application server, and some level of information storage sharing at the storage system level. There are, however, environments wherein a SAN is dedicated to a single storage system. In some SAN deployments, the information is organized in the form of databases, while in others a file-based organization is employed. Where the information is organized as files, the client requesting the information maintains file to mappings and manages file semantics, while its requests (and storage system responses) address the information in terms of block addressing on disk using, e.g., a logical unit number (lun).

A network environment may be provided wherein information (data) is stored in secure storage served by one or more storage systems coupled to one or more security appliances. Each security appliance is configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

Certain security appliances may include the capability of compressing the data before encryption to thereby reduce storage space consumption on cryptainers of the storage system. Typically, the data is organized as a single data stream adapted for compression prior to encryption. A noted disadvantage arises from such security appliances as the compression of the data stream may introduce increased latency to the performance of the security appliance, thereby reducing the throughput of the appliance. The increased latency may result due to, e.g., the speed at which data is received and transferred at network interfaces of the security appliance reaching a level that is faster than that which the security appliance may compress the data. Due to the reduced throughput of the security appliance, clients and/or storage systems may need to limit their data transfer rates. Thus, the latency introduced by data compression in the security appliance may reduce is the overall performance of a storage system environment.

SUMMARY OF THE INVENTION

The disadvantages of the prior art are overcome by providing a system and method for parallel compression of a single data stream within a security appliance. Upon entering a storage encryption processor (SEP) of the security appliance, the data stream is split by a hardware splitting stage into a plurality of data segments. The hardware splitting stage illustratively splits the incoming data stream into substantially equal segments by, e.g., counting the number of bytes flowing through the splitting stage and segmenting after a predefined number of bytes have passed through. The final segment of the data stream may be of an unequal length to the previous segments. Each of the split segments is then stored in a first set of first-in first-out (FIFO) memories. Illustratively, the segments are assigned to the memories in a round-robin fashion, e.g., in an embodiment with N memories, the first segment is stored in the first memory, the $N^{th}$ segment is stored in the $N^{th}$ memory, the $N+1^{st}$ segment is stored in the first memory, etc. The FIFO memories are illustratively one bit wider than the data, e.g., nine bits wide for a byte. The additional bit is utilized as a control bit to identify the last byte of a segment.

For each FIFO memory, a compression core of the SEP reads the data from the FIFO memory and compresses the data contained within each segment. The compression core outputs the compressed segment(s) for temporary storage in a second set of FIFO memories. These FIFO memories are also one bit wider than the data and the compression core asserts the additional control bit to identify the end of a compressed segment. A merging stage then assembles the plurality of compressed segments into a single compressed data stream before passing the single data stream to an encryption stage of the SEP.

The merging stage of the SEP illustratively assembles the data stream beginning with the compressed segment from the first memory of the second set of FIFO memories. In response to detecting the asserted control bit in the first memory, the merging stage switches to the second memory of the second set of memories and proceeds to append its compressed segment to the assembled data stream. The merging stage continues switching and appending compressed segments from the FIFO memories in round robin fashion, thereby ensuring that the segments are assembled into the proper order within the single data stream.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
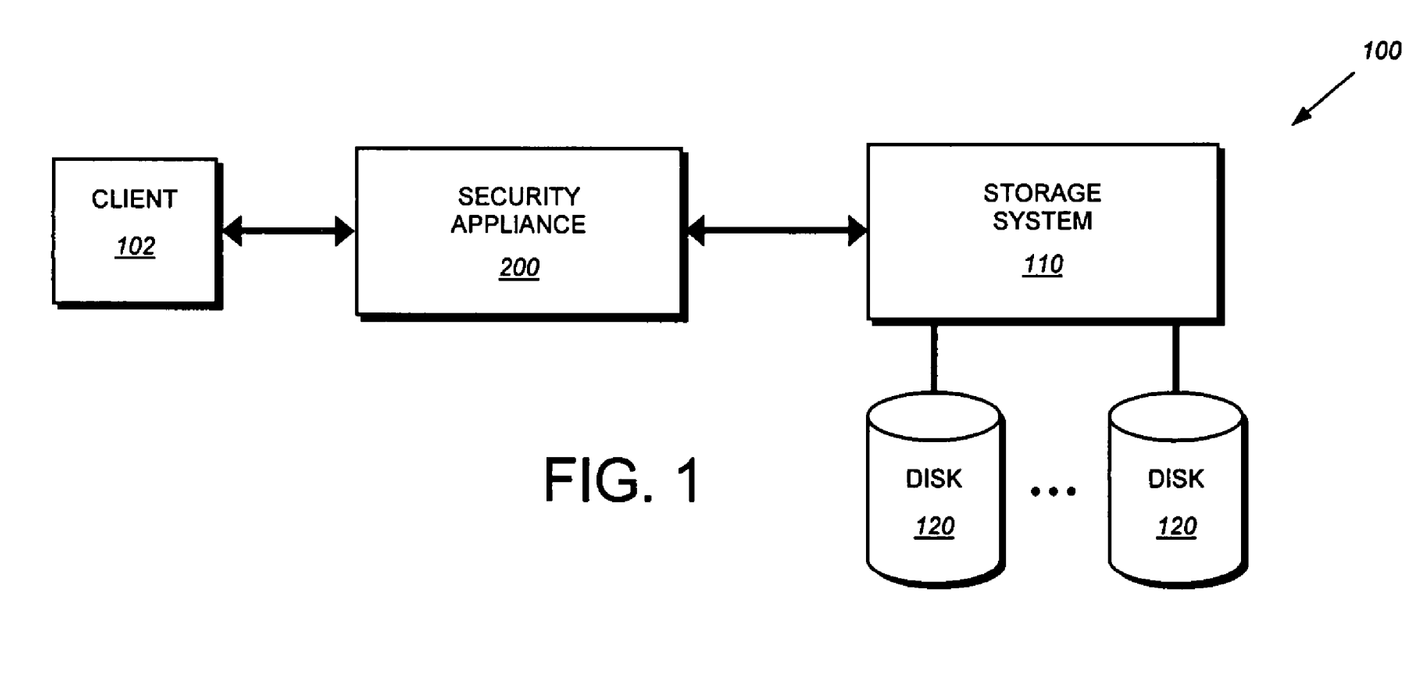
FIG. 1 is a schematic block diagram of an environment including a multi-protocol security appliance that may be advantageously used with the present invention.

FIG. 1 is a schematic block diagram of an environment 100 including a multi-protocol security appliance 200 that may be advantageously used with the present invention. The security appliance 200 is coupled between one or more clients 102 and one or more storage systems 110, such as an application server or filer. The security appliance 200, which is configured to act as an encryption proxy, intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, compresses and then encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in compressed and encrypted form. The security appliance 200 then decrypts and decompresses the data and returns the decrypted/decompressed data to the client 102.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance illustratively uses a high-quality, software or hardware-based pseudo random number generation technique to generate encryption keys. In addition to performing encryption and decryption operations, the security appliance 200 also performs access control, authentication, virtualization, and secure-logging operations, as well as compression and decompression operations.

Figure 2:
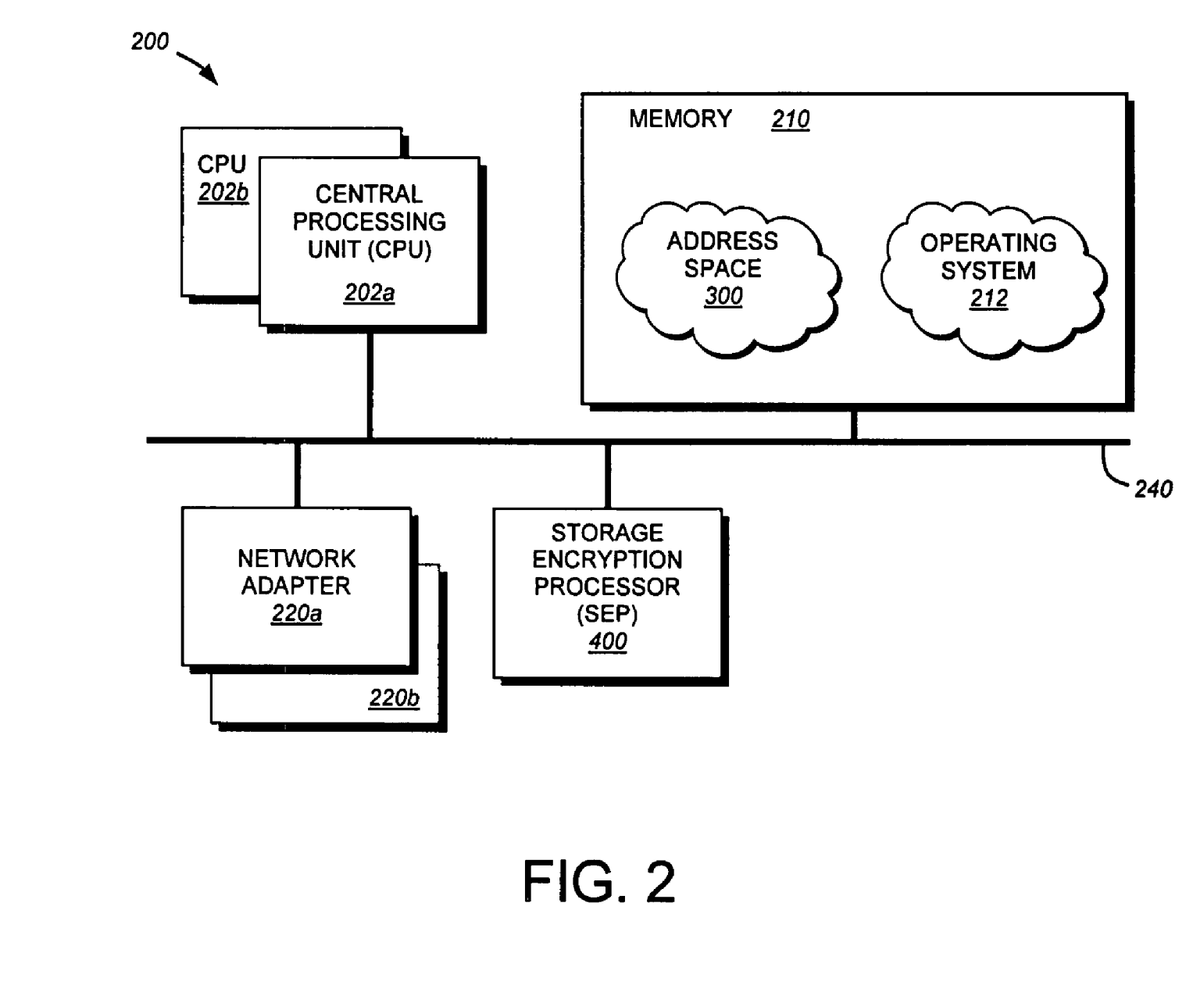
FIG. 2 is a schematic block diagram of the multi-protocol security appliance that may be advantageously used with the present invention.

FIG. 2 is a schematic block diagram of the multi-protocol security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 220a,b), a memory 210, one or more network adapters 220a,b and a storage encryption processor (SEP 400) interconnected by a system bus 240, such as a conventional Peripheral Component Interconnect (PCI) bus. The SEP 400 is configured to perform all encryption/compression and decryption/decompression operations for the security appliance in a secure manner; for example, the SEP is configured to protect plaintext encryption keys from system software executing on each CPU 202. Accordingly, the SEP is illustratively embodied as a FIPS 140-2 certified module that is connected to a dedicated interface card or other similar card.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Figure 3:
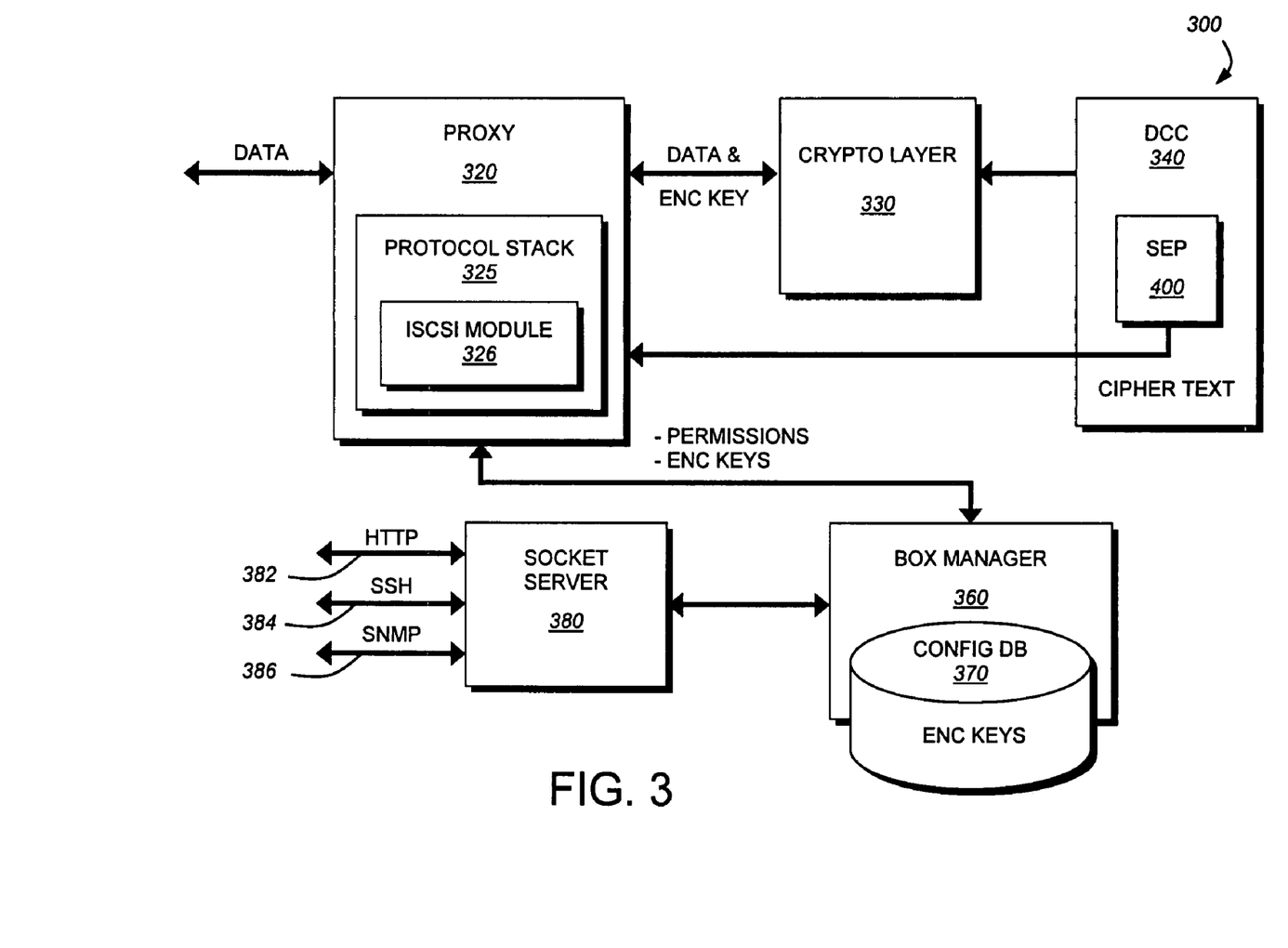
FIG. 3 is a schematic diagram illustrating an arrangement of software processes and modules executing on the security appliance in accordance with the present invention.

The operating system 212 illustratively organizes the memory 210 into an address space arrangement available to the software processes and modules executing on the processors. FIG. 3 is a schematic diagram illustrating an arrangement 300 of software is processes and modules executing on the security appliance 200 in accordance with an embodiment of the present invention. In the illustrative embodiment, the operating system software is a customized version of a Unix type operating system, although other operating systems may be used.

For both NAS and SAN environments, data is received at a proxy 320 of the security appliance. The proxy 320 is illustratively embodied as, e.g., the network protocol stack configured to interpret the protocol over which data is received and to enforce certain access control rules based on one or more policies. Each policy is served by a box manager 360. The box manager 360 is illustratively embodied as a database application process configured to manage a configuration repository or database (Config DB 370) that stores, e.g., encrypted key. A socket server 380 provides interfaces to the box manager 360, including (i) an HTTP web interface 382 embodied as, e.g., a graphical user interface (GUI) adapted for web-based administration, (ii) a SSH interface 384 for command line interface (CLI) command administration, and (iii) an SNMP interface 386 for remote management and monitoring.

Specifically, the box manager 360 supplies the permissions and encrypted keys to the proxy 320, which intercepts data access requests and identifies the sources (clients 102) of those requests, as well as the types of requests and the storage targets (cryptainers) of those requests. The proxy also queries the box manager for permissions associated with each client and, in response, the box manager 360 supplies the appropriate permissions and encrypted key (e.g., a cryptainer key). The proxy 320 then bundles the data together with the encrypted key and forwards that information to a crypto process (layer) 330 that functions as a "wrapper" for the SEP 400. The SEP illustratively resides on an interface card, which is hereinafter referred to a data crypto card (DCC 340).

The crypto layer 330 interacts with the DCC 340 by accessing (reading and writing) registers on the DCC and, to that end, functions as a PCI interface. Illustratively, a descriptor queue is used by the crypto layer to access the DCC by, e.g., supplying starting and ending points of data, as well as offsets into the data, identification of the appropriate algorithm to compress the data, and the encrypted keys used to encrypt the data. The DCC 340 includes one or more previously loaded keys used to decrypt the supplied encrypted keys; upon decrypting an encrypted key, the DCC uses the decrypted key to encrypt the supplied data. Upon completion of compression/encryption of the data, the DCC returns the compress/encrypted data as ciphertext to the proxy 320, which forwards the encrypted data to the storage system 110.

Notably, the security appliance 200 "virtualizes" storage such that, to a client 102, the appliance appears as a storage system 110 whereas, from the perspective of the storage system, the security appliance appears as a client. Such virtualization requires that security appliance manipulate (IP) addresses with respect to data access requests and responses. Illustratively, certain of the customizations to the network protocol stack of the proxy 320 involve virtualization optimizations provided by the appliance. For example, the security appliance 200 manipulates (changes) the source and destination IP addresses of the data access requests and responses.

The present invention provides a system and method for parallel compression of a single data stream within a security appliance. By parallel compression it is meant that a plurality of segments of a single data stream may be compressed in parallel. Such parallelism, i.e., performance of a plurality of operations at once, increases overall throughput of a compression stage to enable, e.g., line speed encryption of FC. Upon entering a storage encryption processor (SEP) of the security appliance, the data stream is split by a hardware splitting stage into a plurality of data segments. The hardware splitting stage illustratively splits the incoming data stream into substantially equal segments by, e.g., counting the number of bytes flowing through the splitting stage and segmenting after a predefined number of bytes have passed through. The final segment of the data stream may be of an unequal length to the previous segments. Each of the split segments is then stored in a first set of first-in first-out (FIFO) memories. Illustratively, the segments are assigned to the memories in a round-robin fashion, e.g., in an embodiment with N memories, the first segment is stored in the first memory, the $N^{th}$ segment is stored in the $N^{th}$ memory, the $N+1^{st}$ segment is stored in the first memory, etc. The FIFO memories are illustratively one bit wider than the data, e.g., nine bits wide for a byte. The additional bit is utilized as a control bit to identify the last byte of a segment.

For each FIFO memory, a compression core of the SEP reads the data from the FIFO memory and compresses the data contained within each segment. The compression core outputs the compressed segment(s) for temporary storage in a second set of FIFO memories. These FIFO memories are also one bit wider than the data and the compression core asserts the additional control bit to identify the end of a compressed segment. A merging stage then assembles the plurality of compressed segments into a single compressed data stream before passing the single data stream to an encryption stage of the SEP.

The merging stage of the SEP illustratively assembles the data stream beginning with the compressed segment from the first memory of the second set of FIFO memories. In response to detecting the asserted control bit in the first memory, the merging stage switches to the second memory of the second set of memories and proceeds to append its compressed segment to the assembled data stream. The merging stage continues switching and appending compressed segments from the FIFO memories in round robin fashion, thereby ensuring that the segments are assembled into the proper order within the single data stream.

Figure 4:
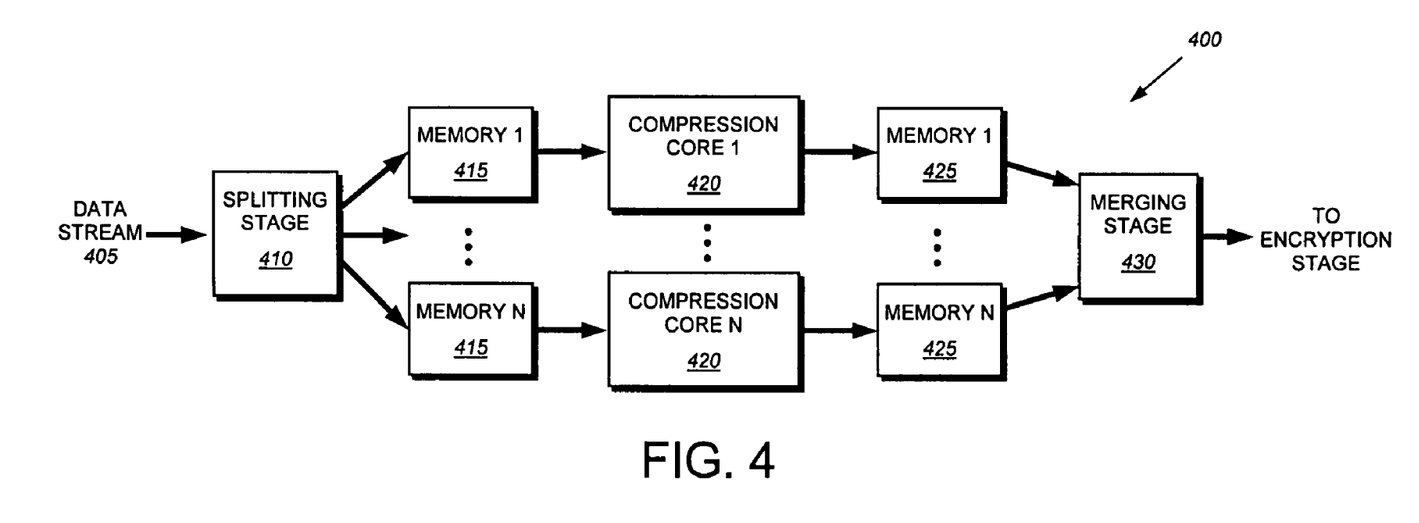
FIG. 4 is a schematic block diagram illustrating the organization of a SEP into stages for parallel compression of a single data stream in accordance with an embodiment of the present invention.

FIG. 4 is a schematic block diagram illustrating the organization of the SEP 400 into various stages for performing parallel compression of a single data stream in accordance with an embodiment of the present invention. The data stream 405 enters the SEP 400 at splitting stage 410. Illustratively the data stream 405 enters the SEP by direct memory access (DMA) operations performed by the proxy 320 after receiving appropriate control instructions from the box manager 360. However, in alternate embodiments the data stream 405 may enter the SEP by alternate means. The splitting stage 410 is illustratively a logic circuit adapted to split the entering data stream 405 into a plurality of smaller data segments. Illustratively, the splitting stage 410 splits the data stream 405 into 8 kilobyte (KB) segments. However, in alternate embodiments, differing segment sizes may be utilized. Furthermore, the splitting stage 410 illustratively splits the data stream into substantially equal length segments. As used herein, substantially equal length segments denotes that each segment, except the last, is equal in size, while the last is segment may be of varying length. For example, if the splitting stage 410 splits on 8 KB boundaries and there is 32 KB of data within the data stream 405, there will be four equal length 8 KB segments. However, if there is 35 KB of data within the data stream, there will be four equal 8 KB segments and one unequal 3 KB segment.

Each segment is fed from the splitting stage 410 into a first set of first-in first-out (FIFO) memories 415. The segments are illustratively fed into the memories in a round robin order, e.g., assuming that there are N memories, then the first segment is stored in the first memory, the $N^{th}$ segment in the $N^{th}$ memory, the $N+1^{st}$ segment is stored back in the first memory, etc. In the illustrative embodiment each of the FIFO memories 415 is one bit wider than the data contained therein. For example, if the data is organized into bytes, each comprising eight bits, then the memories 415 are illustratively nine bits wide.

The additional bit is utilized by the splitting stage 410 as a control bit to signify the end of a particular segment. Thus, in the example of splitting into 8 KB segments, the $8,192^{th}$ byte of a segment has the additional control bit set to signify that it is the final byte of the segment.

Each of the FIFO memories 415 has an associated compression core 420 that retrieves and compares the data from the memories 415. The compression core 420 identifies the end of a particular segment by examining the control bit asserted by the splitting stage 410. The compression core compresses the data in accordance with conventional compression algorithms and techniques. The resulting compressed data segment is then stored in a second set of FIFO memories 425. Similar to memories 415, each FIFO memory 425 includes an additional control bit that is illustratively asserted by the compression core 420 to signify the end of a compressed segment. As the data segments exiting the compression core 420 may be of variable lengths (i.e., depending upon the effectiveness of the compression algorithm), the control bit is utilized to identify the end of each compressed segment. The outputs of the second set of FIFO memories 425 are fed into a merging stage 430 that assembles the segments into a single compressed data stream to be fed to an encryption stage of the SEP. Illustratively, the merging stage 430 assembles the data stream beginning with the compressed segment from a first memory 425. The stage 430 retrieves data from the first memory 425 until it reaches a control bit signifying the end of the compressed segment, at which point it begins retrieving (reading) data from a next memory 425. The data from the next memory is then illustratively appended to the compressed segment from the first memory. The merging stage 430 illustratively continues reading and appending data in such a round robin fashion, i.e., reading data from a memory until an end of segment is identified, appending that data to the compressed data stream and then moving to a next memory, to generate an appropriately ordered single compressed data stream.

Figure 5:
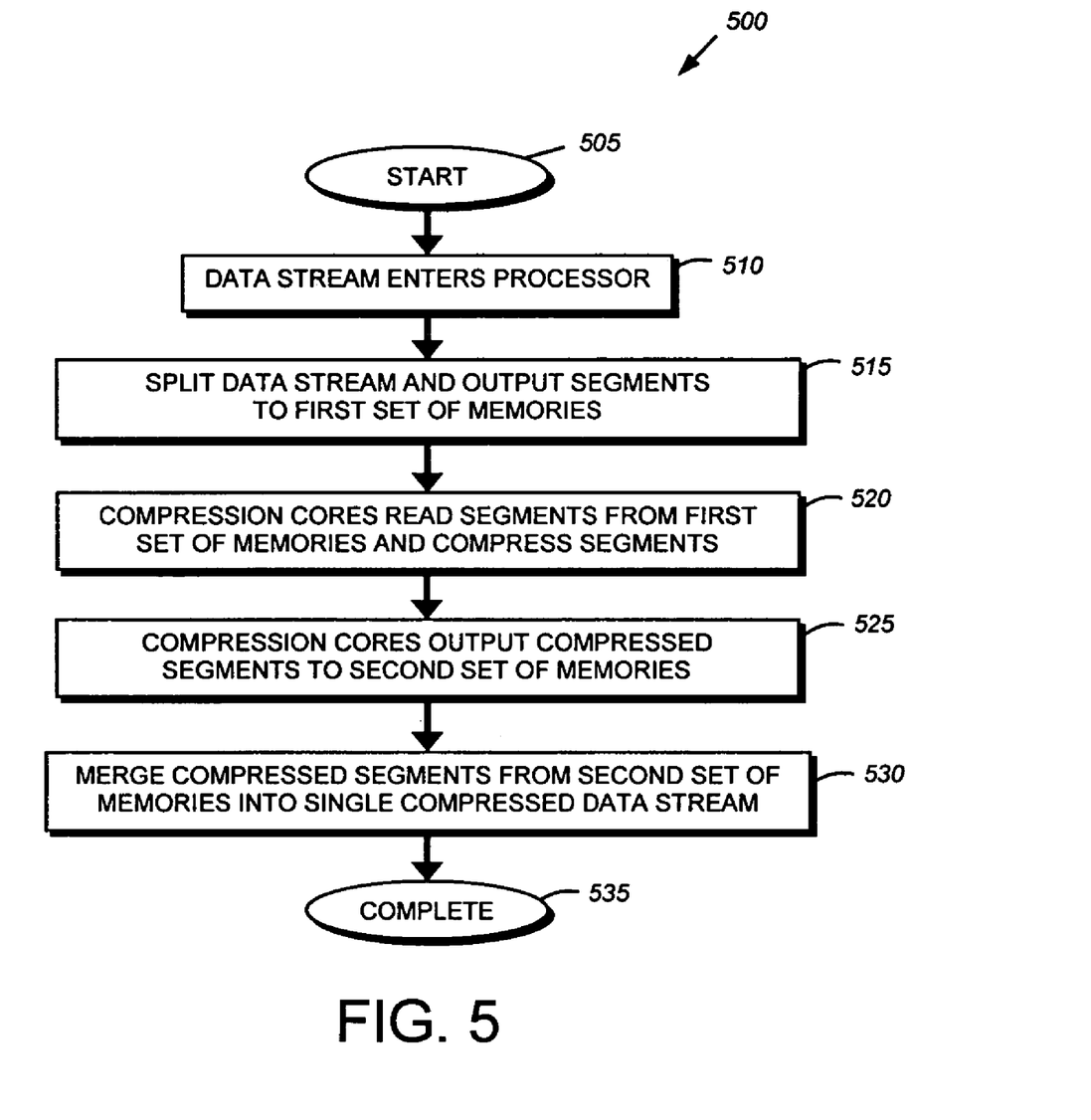
FIG. 5 is a flowchart detailing the steps of a procedure for performing parallel compression of a single data stream in accordance with an embodiment of the present invention.

FIG. 5 is a flowchart detailing the steps of a procedure 500 for performing parallel compression of a single data stream in accordance with an embodiment of the present invention. The procedure 500 begins in step 505 and continues to step 510 where the single data stream enters the SEP. The data stream may enter the SEP by being copied into the SEP via a DMA operation performed by the security appliance. The single data stream then enters a splitting stage that splits a data stream into substantially equal segments and outputs the segments to a first set of FIFO memories in step 515. Illustratively, the segments are temporarily stored (buffered) in the FIFO memories in a round robin fashion. Furthermore, the end of each segment is marked to enable easy identification of the end of a segment.

The compression cores associated with the FIFO memories read and compress the segments from the memories in step 520. Each compression core then buffers the compressed segments in a second set of FIFO memories in step 525. Again, in the illustrative embodiment, the compressed segments are buffered in the memories in a round robin fashion. Finally a merging stage merges the compressed segments from the second FIFO memories into a single compressed data stream in step 530, thereby preserving the order of the original data stream. The procedure 500 then completes in step 535.

It should be noted that while the present invention has been described in terms of to a compression stage prior to encryption within a SEP, the principles of the present invention may be utilized in any compression implementation where a single data stream is utilized. Thus, for example, the present invention may be utilized in an environment where only compression occurs, i.e., only compression with no encryption. Furthermore, in the illustrative embodiment, the present invention is implemented on a single inters grated circuit; however, in alternate embodiments, the compression stage may be implemented on any number of integrated circuits. Furthermore, while the present invention has been written in terms of hardware splitting and merging stages, the principles of the present invention may be utilized with software, firmware, hardware or a combination thereof. As such, the description of hardware stages should be taken as exemplary only. Additionally, while FIFO memories are described, other forms of memories may be utilized with appropriate addressing schemes to ensure proper ordering of data contained therein.

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. It should be noted that while this description is written in terms of compression of a single data stream within a SEP, the principles of the present invention may be utilized in non-SEP environments. Thus, the description of a SEP based implementation should be taken as exemplary only. Furthermore, while this description describes storing segments and/or compressed segments in a set of memories in a round robin fashion, other orderings may be utilized that enable the present invention to preserve a deterministic final order of data in a resulting compressed data stream. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for compressing a single data stream, the method comprising:
   receiving the single data stream and an associated encryption key;
   splitting, by a storage encryption processor of a security appliance, the single data stream into a plurality of segments, wherein the storage encryption processor of the security appliance performs at least one of encrypting data and decrypting the data;
   storing, by the storage encryption processor of the security appliance, the plurality of segments in a first set of memories;
   reading, by the storage encryption processor of the security appliance, the plurality of segments from the first set of memories to compress the plurality of segments in parallel within the security appliance to achieve parallel compression of the single data stream;
   storing, by the storage encryption processor of the security appliance, the plurality of compressed segments in a second set of memories;
   merging, by the storage encryption processor of the security appliance, the plurality of compressed segments from the second set of memories into a single compressed data stream; and
   in response to merging the plurality of compressed segments into the single compressed data stream by the storage encryption processor, encrypting, by the storage encryption processor of the security appliance, the single compressed data stream utilizing the associated received encryption key.

2. The method of claim 1 further comprising marking an end of each of the plurality of segments before storing the plurality of segments in the first set of memories.

3. The method of claim 1 further comprising marking each of the plurality of compressed segments before storing the plurality of compressed segments in the second set of memories.

4. The method of claim 1 wherein the plurality of segments are stored in the first set of memories using a round robin technique.

5. The method of claim 1 wherein the plurality of compressed segments are merged from the second set of memories into the single compressed data stream using a round robin technique.

6. The method of claim 1 wherein the plurality of segments are substantially equal in length.

7. A system adapted to compress a single data stream within a security appliance, the system comprising:
   the security appliance to receive the single data stream and an associated encryption key, wherein the security appliance performs at least one of encrypting data and decrypting data;
   a splitting stage of the security appliance configured to split the single data stream into a plurality of segments and further configured to store the plurality of segments in a first set of memories;
   a plurality of compression cores of the security appliance, each compression core associated with one of the first set of memories, each compression core configured to read one or more of the plurality of segments from the associated memory and further configured to compress the plurality of segments in parallel within the security appliance to achieve parallel compression of the single data stream before storing the plurality of compressed segments in a second set of memories;
   is a merging stage of the security appliance configured to merge the plurality of compressed segments into a single compressed data stream; and
   an encryption stage of the security appliance configured to utilize the encryption key to encrypt the single compressed data stream in response to the plurality of compressed segments being merged into the single compressed data stream.

8. The system of claim 7 wherein the plurality of segments are substantially equal in length.

9. The system of claim 7 wherein the splitting stage is further configured to store the plurality of segments in the first set of memories in a round robin order.

10. The system of claim 7 wherein the splitting stage is further configured to mark an end of each of the plurality of segments.

11. The system of claim 10 wherein the splitting stage is further configured to assert one or more control bits in the first set of memories to mark the end of each of the plurality of segments.

12. The system of claim 7 wherein the compression cores are further configured to mark an end of each of the plurality of compressed segments.

13. The system of claim 12 wherein the compression cores are further configured to assert one or more control bits in the second set of memories to mark the end of each of the plurality of compressed segments.

14. A system configured to compress a single data stream, the system comprising:
   means for receiving the single data stream and an associated encryption key;
   means for splitting, upon entering a storage encryption processor of a security appliance, the single data stream into a plurality of segments, wherein the storage encryption process of the security appliance performs at least one of encrypting data and decrypting data;

means for storing, while at the storage encryption processor of the security appliance, the plurality of segments;

means for reading, while at the storage encryption processor of the security appliance, the plurality of segments to compress the plurality of segments in parallel within the security appliance to achieve parallel compression of the single data stream;

means for storing, while at the storage encryption processor of the security appliance, the plurality of compressed segments;

means for merging, while at the storage encryption processor of the security appliance, the plurality of compressed segments into a single compressed data stream; and means for encrypting, before exiting the storage encryption processor of the security appliance, the single compressed data stream using the received encryption key in response to merging the plurality of compressed segments into the single compressed data stream.

15. The system of claim 14 further comprising means for marking an end of each of the plurality of segments before it is stored.

16. The system of claim 14 further comprising means for marking each of the plurality of compressed segments.

17. The system of claim 15 wherein the means for storing stores the plurality of segments using a round robin technique.

* * * * *

UNITED STATES PATENT AND TRADEMARK OFFICE
CERTIFICATE OF CORRECTION

PATENT NO. : 7,995,759 B1
APPLICATION NO. : 11/528786
DATED : August 9, 2011
INVENTOR(S) : Joakim Bengt Lennart Tolfmans Page 1 of 1

It is certified that error appears in the above-identified patent and that said Letters Patent is hereby corrected as shown below:

Col. 2, line 27: should read - "client requesting the information maintains file-mappings"

Col. 3, line 7: should read - "by data compression in the security appliance may reduce"

Col. 5, line 41: should read - "ment 300 of software processes and modules executing on"

Col. 8, line 55: should read - "been described in terms of a compression stage prior to encrypt"

Col. 8, line 62: should read - "invention is implemented on a single integrated circuit;"

Col. 10, line 34: should read - "a merging stage of the security appliance configured to"

Col. 12, line 11: should read - "The system of claim 14 wherein the means for storing"

Signed and Sealed this
Fourth Day of October, 2011

David J. Kappos
*Director of the United States Patent and Trademark Office*